United States Patent Office 3,061,648
Patented Oct. 30, 1962

3,061,648
PREPARATION OF VINYL SULFIDES FROM ETHANE 1,2-BIS SULFIDES
Henry J. Schneider, Hatboro, Pa., assignor to Rohm & Haas Company, Philadelphia, Pa., a corporation of Delaware
No Drawing. Filed Aug. 1, 1960, Ser. No. 46,334
7 Claims. (Cl. 260—609)

This invention relates to a method for preparing vinyl sulfides. More particularly, it is concerned with a process whereby relatively unusable ethane 1,2-bis-sulfides ($RSCH_2CH_2SR$) are converted to vinyl sulfides which are highly useful polymerizable monomers.

In essence, the present invention involves a process for preparing the desired vinyl sulfides by reversion of the bis-sulfides through a base-catalyzed elimination reaction and a simultaneous vinylation reaction, the overall process being brought about by the presence of acetylene.

In the conventional methods for preparing vinyl sulfides by the vinylation of mercaptans in the presence of alcohols or other suitable solvents, such as those disclosed in U.S. Patents 2,081,766 of Reppe et al. and 2,910,480 of Schneider, quantities of ethane 1,2-bis-sulfides are regularly obtained. In fact, under adverse conditions they can be the major rather than the minor product. These saturated sulfides are, of course, non-polymerizable and therefore leave much to be desired with respect to their utility.

For the reasons just given, the conversion of the bis-sulfides to vinyl sulfides is extremely important. The prior art has known that compounds such as 1,2-bis-(phenylthio)ethane can be reverted by a thermal technique (cf. U.S. Patent No. 2,490,875) to (phenyl)vinyl sulfides in 20 percent yield. This process is deficient on several counts. One is the fact that the maximum yield under the most favorable conditions is about 50 percent. A second is the fact that the mercaptan and vinyl sulfide can recombine to reform the starting material. The prior art reaction may be represented as Equation 1:

(1)
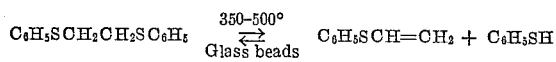

The utilization of a base catalyst in the presence of acetylene, in accordance with the present invention, has eliminated both of these deficiencies by conversion of the eliminated mercaptan to a vinyl sulfide. By this technique the reversion of 1,2-bis(n-butylthio)ethane to n-butyl vinyl sulfide has been accomplished with yields of 90–95 percent in accordance with the reaction in Equation 2 and as illustrated in detail by Example 1:

(2)
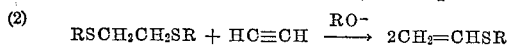

in which R is an alkyl (normal, secondary or tertiary) radical, or an aryl or aralkyl moiety.

Important to the procurement of such high conversion and yields are (1) the presence of acetylene, (2) a mixed solvent system comprising an alcohol and a polar solvent such as dimethyl sulfoxide or N-methyl pyrrolidone, and (3) a strong base, such as an alkoxide or stronger, used in catalytic amounts. Typical reaction systems encompassing these requirements are illustrated by Examples 1 and 2.

Example 1

A solution of 1,2-bis(n-butylthio)ethane (74 g., 0.36 mole) and dimethyl sulfoxide (43 g.) in t-butanol (40 ml.) containing dissolved potassium metal (1.5 g., 0.038 mole) absorbed acetylene (27 g., 1.04 moles) when reacted at 145–165° C. for 49 minutes under 220–470 p.s.i.g. acetylene pressure. The dark reaction product (179 g.) which contained liquid and solids was flash-distilled to give a residue (19 g.) and a flash distillate (150 g.). Distillation of this flash distillate gave:

(a) t-butyl vinyl ether (21.4 g., 0.214 mole) containing t-butanol (11.6 g., 0.157 mole);
(b) n-butyl vinyl sulfide (76 g., 0.654 mole);
(c) Dimethyl sulfoxide (30 g.); and
(d) 1,2-bis(n-butylthio)ethane (4 g., 0.019 mole).

The recoveries represent conversion to n-butyl vinyl sulfide of 91% and a yield of 96.2%.

Example 2

1,2-bis(n-butylthio)ethane (80 g., 0.387 mole) and a solution of potassium metal (1.5 g., 0.384 mole) in t-butyl alcohol (35 ml.) was charged to a 240 ml. magnetically-stirred autoclave containing N-methyl pyrrolidone (30.7 g., 30 ml. $n_D^{25}=1.4682$).

The reaction mixture was heated to 130° C., and acetylene was introduced under pressure. The reaction was exothermic over a period of 63 minutes, and the temperature ranged from 130–155° C. Acetylene (24 g., 0.29 mole) was absorbed.

The crude reaction product was flash-distilled into a Dry Ice-acetone bath to give a light yellow distillate (138 g., maximum pot temperature 132° C.) and a soft black solid residue (19 g.). The flash distillate was distilled through a packed column to give n-butyl vinyl sulfide (82 g., 0.706 mole) which represents a conversion and yield of 91.2%.

In the absence of acetylene, the reversion of the bis-sulfide to vinyl sulfide will occur only to a slight extent, equal to less than the molar concentration of catalyst employed, as illustrated by Example 3.

Example 3

The conditions of Example 1 were duplicated, except that the reaction was conducted under nitrogen pressure instead of acetylene pressure. Distillation of the reaction products provided n-butyl vinyl sulfide (ca. 2 g., 0.01 mole). This represents a conversion of 2.7%.

Comparison of the poor conversions in Example 3 with the excellent conversions in Examples 1 and 2 illustrates sharply the necessity for the presence of acetylene to effect the reaction.

Rather surprisingly, the use of a mixed solvent system is also important to the procurement of the high yields and conversions illustrated in Examples 1 and 2. The mixed solvent system comprises a polar solvent such as dimethyl sulfoxide or N-methyl pyrrolidone in conjunction with an alcohol. Alcohol alone, if enough were used, would be sufficient to support vinylation. However, it would be completely impractical because it would take a tremendous amount, and the volumes required would be out of the question from the viewpoint of reactive productivity. To illustrate, it may take 100 pounds of alcohol to yield one pound of product, the actual quantity of alcohol depending upon the rate of vinylation.

The conversion of the bis-sulfide to the vinyl sulfide varies inversely with the rate of vinylation of the alcohol. The ability of the alcohol alone to support the reaction and the relative effect of alcohol vinylation rate is illustrated by Examples 4 and 5 which demonstrate the use of t-butanol and isobutanol, respectively. Illustrative of the many alcohols which can be used are those disclosed in copending application Serial Number 789,257, now Patent No. 2,969,395, and they are hereby incorporated herein by reference, although t-alkanols are preferred, particularly those in the $C_4$–$C_8$ range.

Example 4

1,2-bis(n-butylthio)ethane was redistilled to provide pure starting material, B.R. 70.5–71.2° C./0.08 mm., $n_D^{20}$, 1.4963, $n_D^{25}$, 1.4958.

$d_{20}^{20}$, 0.9370, $d_{25}^{25}$, 0.9342

Calc. for $C_{10}H_{22}S_2$: C, 58.19; H, 10.74; S, 31.07; $M_D$, 64.38. Found: C, 58.02; H, 10.90; S, 21.33; $M_D$, 64.64.

A solution of 1,2-bis(n-butylthio)ethane (85 g., 0.412 moles) in t-butanol (50 ml.) containing dissolved potassium metal (1.6 g., 0.041 mole) absorbed acetylene (15 g., 0.577 mole) when reacted at 150–162° C. for one hour under 360–480 p.s.i.g. acetylene pressure. The dark reaction product (132 g.) contained liquids and solids. The solids (8 g.) remained as a residue upon flash distillation, and rectification of the flash distillate gave: (a) t-butyl vinyl ether (27 g., 0.27 mole) containing t-butanol (6 g., 0.08 mole); (b) n-butyl vinyl sulfide (43 g., 0.37 mole); and (c) 1,2-bis(n-butylthio)ethane (41 g., 0.2 mole). These recoveries represent a conversion to n-butyl vinyl sulfide of 45% and a yield of 90%.

*Example 5*

A solution of potassium metal (1.6 g., 0.041 mole) in isobutanol (50 mm.) and 1,2-bis(n-butylthio)ethane (85 g., 0.412 mole) was charged to a 240 ml. magnetically-stirred autoclave, and heated to 140° C., at which point acetylene was introduced under pressure. The reaction was continued for 65 minutes, and the temperature ranged from 141–165° C. Over this period, acetylene (17 g., 0.655 mole) was absorbed.

The reaction product, after cooling, was flash-distilled into a Dry Ice-acetone bath to give a light-colored distillate (126 g., pot temperature to 140° C.), and a dark brown semi-solid residue (12 g.), which when treated with water gave gas evolution and an inorganic layer. The flash distillate was further rectified by distillation through a packed column to give n-butyl vinyl sulfide (13 g., 0.112 mole), representing a conversion of 13.6% and an overall yield from 1,2-bis(n-butylthio)ethane of 64.4%. The total accountability of the starting material was 93%.

Surprisingly, the polar solvent alone is not a suitable solvent for the process. As illustrated in Example 6, conversions and yields of the bis-sulfides to the vinyl sulfides are lower when dimethyl sulfoxide is used alone than when a mixed solvent of dimethyl sulfoxide and t-butanol is employed, as is illustrated in Example 1.

*Example 6*

The conditions of Example 1 were repeated, except that dry sodium methoxide was employed in place of the solution of potassium t-butoxide as a catalyst, and no t-butanol was added. The conversion of 1,2-bis(n-butylthio)ethane and the yields of n-butylvinyl sulfide were 23.1% and 64%, respectively.

The composition of the solvent system can vary over rather wide limits depending upon (1) the specific nature of the alcoholic component and (2) the specific structure of the polar solvent. The ratio can vary from 10 parts polar solvent: 1 part alcohol to 1 part polar solvent/10 parts alcohol. The preferred solvent system is approximately 1 part polar solvent: 1 part alcohol, as illustrated in Examples 1 and 2.

A variety of other solvent systems have been found unsuitable for the process. These include phenol, pyrrolidone-2, 1,4-dioxane and water. The main function of the polar solvent appears to be maintenance of homogeneity during the performance of the process, which contributes to the high yields and conversion illustrated in Examples 1 and 2.

Highest conversions and yields are obtainable in the process when a strong base, such as an alkoxide or stronger, is used in catalytic amounts to effect the reversion of the bisulfides to the vinyl sulfides. The quantity of catalyst employed can be varied from as little as 0.1 mole percent to as much as 20 mole percent, although a range of 1.0 to 10 mole percent is preferred. At the lower end of the permissible range the reaction may go more slowly than desired and this may prompt the use of increased amounts. At the upper end of the complete range there may be waste caused by unused catalyst, and this may dictate the use of lesser amounts in some instances.

The reversion of ethane 1,2-bis-sulfides to vinyl sulfides in accordance with the present invention has been carried out in conventional batch reactors and under condensed phase conditions in a coil reactor. In the latter case a portion of each of the reactants optionally could be pumped into the reactor under pressure at various points along the coil, or all of them could be put through the coil simultaneously. The reaction temperature in both batch and coil sysems can be varied over a wide range such as 50° to 250° C., but temperatures in the range of 100–175° C. are preferred.

The structure of the bis-sulfide is not critical, so long as it contains no substituents which are base-reactive or which function to destroy the catalyst. The principal functional groups which can be employed as substituents on the bis-sulfide are ether linkages or thioether linkages, hydroxyl groups and amine groups. The ethane bis-sulfide can be substituted on the ethane moiety by a variety of substituents, including alkyl, aralkyl and aryl derivatives, which are more fully disclosed in copending application Serial Number 46,358, filed on August 1, 1960. Illustrative of a substituted vinyl sulfide available by this process is methoxymethylvinyl sulfide, as illustrated in Example 7.

*Example 7*

A solution of 1,2-bis(methoxymethylthio)ethane (0.3 mole), t-butanol (40 ml.) and potassium t-butoxide (0.03 mole) was reacted as generally indicated in Example 1 with acetylene at 110–157° C. for one hour at 250 p.s.i.g. acetylene pressure. Conversion to methoxymethyl vinyl sulfide was 43%.

Vinyl sulfides prepared in accordance with this invention are useful for providing polymers, both homopolymers and copolymers formed with other unsaturated polymerizable materials. The polymers find use in textile finishing, leather, paper, and the coating art. They can be formulated to give additives for fuel oils and lubricating oils. The monomers can be used also as chemical intermediates, reacting at the vinyl linkage with mercaptans, for example or at the sulfide linkage. Thus, the vinyl sulfides are oxidized with aqueous hydrogen peroxide to give sulfoxides and then sulfones which are valuable modifiers for cellulose. The vinyl sulfides serve as dienophiles, reacting, for instance, with cyclopentadiene, or with other conjugated unsaturated compounds. The monomers also are useful as softeners of plastics, particularly when they have groups of four or more carbon atoms, and as regulators or promotors in the polymerization of vinylidene compounds with peroxide catalysts, serving, for example, to control chain length when used in low concentrations.

I claim:

1. Process for preparing vinyl sulfides from ethane 1,2-bis sulfides, comprising, reacting the bis sulfide with acetylene in the presence of from 0.1 to 20 mole percent of a strongly basic catalyst selected from the class consisting of sodium and potassium and their alkoxides in which the alkyl group ranges from $C_1$ to $C_4$, and a mixed solvent system whose ratio ranges from one part alcohol for up to ten parts of a polar solvent to one part of the polar solvent for up to ten parts of the alcohol, the bis sulfide which is reacted being one which contains no constituents which are base-reactive and which might function to destroy the catalyst, and consists of compounds selected from the class consisting of those having the general structural formula $RSCH_2CH_2SR$, compounds having as substituents on the bis-sulfide of that structure a member of the class consisting of ether linkages, thioether linkages, hydroxyl groups and amino groups, and compounds having as substituents on the ethane moiety of that structure a member of the class consisting of alkyl, aralkyl, and aryl groups.

2. Process for preparing vinyl sulfides from ethane bis-sulfides, comprising, reacting the bis sulfide with acetylene in the presence of from 0.1 to 20 mole percent of a basic catalyst selected from the class consisting of sodium and potassium and their alkoxides in which the alkyl group ranges from $C_1$ to $C_4$ and a mixed solvent system whose ratio ranges from one part alcohol for up to ten parts of a polar solvent to one part of the polar solvent for up to ten parts of the alcohol, the R in the formula being selected from the group consisting of normal, secondary and tertiary alkyl radicals, and aryl and aralkyl moieties, the bis-sulfide which is reacted being one which contains no constituents which are base-reactive and which might function to destroy the catalyst, and consists of compounds selected from the class consisting of those having the general structural formula $RSCH_2CH_2SR$, compounds having as substituents on the bis-sulfide of that structure a member of the class consisting of ether linkages, thioether linkages, hydroxyl groups and amino groups, and compounds having as substituents on the ethane moiety of that structure a member of the class consisting of alkyl, aralkyl, and aryl groups.

3. The process of claim 2 in which the polar solvent is selected from the class consisting of dimethyl sulfoxide and N-methyl pyrrolidone, the alcohol is a t-alkanol in the $C_4$ to $C_8$ range, and the basic catalyst is selected from the class consisting of sodium methoxide, potassium t-butoxide, and dissolved potassium metal.

4. Process for preparing n-butyl vinyl sulfide, comprising, reacting 1,2-bis(n-butylthio)ethane with acetylene in the presence of dimethyl sulfoxide and a solution of potassium metal in t-butanol at a temperature in the range of 50° to 250° C. and an acetylene pressure of at least about 220 p.s.i.g.

5. Process for preparing n-butyl vinyl sulfide, comprising, reacting 1,2-bis(n-butylthio)ethane with acetylene in the presence of N-methyl pyrrolidone and a solution of potassium metal in t-butyl alcohol at a temperature in the range of at least about 50° to 250° C. and an acetylene pressure of at least about 220 p.s.i.g.

6. Process of preparing n-butyl vinyl sulfide, comprising, reacting 1,2-bis(n-butylthio)ethane with acetylene in the presence of sodium methoxide at a temperature in the range of 50° to 250° C. and an acetylene pressure of at least about 220 p.s.i.g.

7. Process for preparing methoxymethyl vinyl sulfide, comprising, reacting 1,2-bis(methoxymethylthio)ethane with acetylene in the presence of potassium t-butoxide and t-butanol at a temperature in the range of 50° to 250° C. and an acetylene pressure of at least about 220 p.s.i.g.

No references cited.